United States Patent

Miyaki et al.

(10) Patent No.: US 8,530,067 B2
(45) Date of Patent: Sep. 10, 2013

(54) BATTERY

(75) Inventors: Yukio Miyaki, Kanagawa (JP); Tomoo Takada, Kanagawa (JP); Kenichi Kawase, Kanagawa (JP); Yukiko Iijima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1503 days.

(21) Appl. No.: 10/821,368

(22) Filed: Apr. 9, 2004

(65) Prior Publication Data

US 2004/0224219 A1 Nov. 11, 2004

(30) Foreign Application Priority Data

Apr. 10, 2003 (JP) .............................. P2003-106464

(51) Int. Cl.
*H01M 4/00* (2006.01)
*H01M 6/10* (2006.01)
*H01M 4/02* (2006.01)
*H01M 4/13* (2010.01)
*H01M 4/58* (2010.01)

(52) U.S. Cl.
USPC ........................ 429/94; 429/218.1; 429/209

(58) Field of Classification Search
USPC .................................. 429/94, 60, 209, 218.1
See application file for complete search history.

(56) References Cited

U.S. PATENT DOCUMENTS

| 6,270,923 | B1 * | 8/2001 | Bito et al. | 429/218.1 |
| 7,241,533 | B1 * | 7/2007 | Ikeda et al. | 429/233 |
| 2004/0043294 | A1 * | 3/2004 | Fukui et al. | 429/235 |

FOREIGN PATENT DOCUMENTS

| EP | 0704921 | | 4/1996 |
| EP | 0789412 | | 8/1997 |
| EP | 1179869 | | 2/2002 |
| JP | 06-290774 | | 10/1994 |
| JP | 09-213373 | | 12/1997 |
| JP | 2000-133300 | | 10/2000 |
| JP | 2001-266851 | | 9/2001 |
| JP | 2002-373647 | | 12/2002 |
| JP | 2003-086186 | | 3/2003 |
| WO | WO01/29918 | * | 4/2001 |
| WO | WO 02/21616 A1 | * | 3/2002 |

* cited by examiner

*Primary Examiner* — Eugenia Wang
(74) *Attorney, Agent, or Firm* — Dentons US LLP (57) ABSTRACT

Provided is a battery capable of obtaining superior cycle characteristics. The battery comprises a cylindrical type spirally wound body including a spirally wound laminate of a cathode and an anode with a separator in which an electrolyte solution is impregnated. The anode includes an anode current collector, an outer anode active material layer disposed on an outer winding surface of the anode current collector and an inner anode active material layer disposed on an inner winding surface of the anode current collector. The outer anode active material layer and the inner anode active material layer include Si, Sn or a compound thereof. The capacity ratio between the outer anode active material layer and the inner anode active material layer in at least one region is within a range of 0.6 to 0.8 inclusive.

3 Claims, 4 Drawing Sheets

BATTERY

RELATED APPLICATION DATA

The present application claims priority to Japanese Application(s) No(s). P2003-106464 filed Apr. 10, 2003, which application(s) is/are incorporated herein by reference to the extent permitted by law.

BACKGROUND OF THE INVENTION

1. Field of the Invention

The present invention relates to a battery comprising a spirally wound body including a spirally wound laminate of a cathode and an anode with an electrolyte in between.

2. Description of the Related Art

With the recent advance of electronic technology, small and portable electronic devices such camcorders, cellular phones and laptop computers have been developed, and as power sources for the electronic devices, the development of small and lightweight secondary batteries with higher energy density has been strongly required.

Previously, secondary batteries using a graphite material which uses an intercalation reaction of lithium (Li) between graphite layers, or a carbonaceous material which uses an application of insertion/extraction reactions of lithium in pores as an anode active material have been developed, and have been put to wide practical use.

On the other hand, a demand for the capacity of the secondary batteries has further grown with a recent increase in performance of portable electronic devices. Moreover, as the portable electronic devices have become widespread, widely various demands for characteristics have been made. For example, as the operating time of devices becomes longer, the secondary batteries are required to have a higher capacity, and an improvement of cycle characteristics is strongly required so that the battery can be reused many times. Further, as the storage conditions of the batteries by users are diversified, higher performance in storage characteristics has been required.

As a battery which meets such requirements, a battery using light metal such as lithium metal as an anode active material is cited. However, in the battery, as light metal is easily deposited on an anode to form a lithium dendrite during charge, a current density becomes extremely high at an end of the dendrite, thereby the life span of the battery may be reduced due to decomposition of the electrolyte or the like, or the dendrite is excessively grown, thereby an internal short circuit in the battery may occur.

On the other hand, secondary batteries using an alloying reaction between lithium and another metal have been proposed, and among them, great expectations are placed on a secondary battery comprising an anode including silicon (Si) or tin (Sn) (for example, refer to Japanese Unexamined Patent Application Publication Nos. 2001-176545 and 2001-319696), because the battery has a large amount of lithium insertion.

However, silicon and tin each have an insertion amount of 4.4 or over lithium atoms per atom thereof, so a large change in volume of 300% to 400% occurs according to charge and discharge, and the cycle characteristics are not sufficient, therefore, a solution to this is eagerly required. A large number of improvements in performance mainly by adjustment of the composition of the anode active material have been previously proposed. Examples of an anode active material of which the composition is adjusted include an alloy including lithium, aluminum (Al) and tin (for example, refer to Japanese Unexamined Patent Application Publication No. Sho 61-66369), an alloy including tin and zinc (for example, refer to Japanese Unexamined Patent Application Publication No. Sho 62-145650), a tin alloy including 1 wt % to 55 wt % of phosphorus (P) (for example, refer to Japanese Unexamined Patent Application Publication No. Hei 8-273602), $Cu_2NiSn$, $Mg_2Sn$ (for example, refer to Japanese Unexamined Patent Application Publication No. Hei 10-223221) and an alloy including tin and copper (for example, Japanese Unexamined Patent Application Publication No. Hei 10-308207). However, as a change in the volume of each of these anode active materials is also large, it is difficult to sufficiently improve the cycle characteristics thereof. Specifically, in a battery comprising a spirally wound laminate including a cathode and an anode, a break in the anode may occur, or a wrinkle may occur in the anode to generate a reaction active site, thereby resulting in decomposition of the electrolyte in the reaction active site.

SUMMARY OF THE INVENTION

In view of the foregoing, it is an object of the invention to provide a battery capable of obtaining superior cycle characteristics.

A battery according to the invention comprises: a spirally wound body including a spirally wound laminate of a cathode and an anode with an electrolyte in between, wherein the anode includes: an anode current collector having a pair of facing surfaces; an outer anode active material layer disposed on an outer winding surface of the anode current collector; and an inner anode active material layer disposed on an inner winding surface of the anode current collector, and the outer anode active material layer and the inner anode active material layer both include at least one kind selected from the group consisting of metal elements and metalloid elements both capable of alloying with lithium and compounds thereof, and as a capacity ratio between the outer anode active material layer and the inner anode active material layer in at least a region, assuming that the capacity of the outer anode active material layer is 1, the capacity of the inner anode active material layer facing the outer anode active material layer with anode current collector in between is within a range of 0.6 to 0.8 inclusive.

In the battery according to the invention, although the outer anode active material layer and the inner anode active material layer expand and shrink according to charge and discharge, as a capacity ratio between the outer anode active material layer and the inner anode active material layer in at least a region, assuming that the capacity of the outer anode active material layer is 1, the capacity of the inner anode active material layer is 0.8 or less, so a break in the anode can be prevented, and a wrinkle can be prevented from occurring in the anode, thereby the decomposition of an electrolyte can be prevented. Moreover, the capacity of the inner anode active material layer is 0.6 or over, so a superior capacity can be obtained.

Other and further objects, features and advantages of the invention will appear more fully from the following description.

DETAILED DESCRIPTION OF THE PREFERRED EMBODIMENTS

A preferred embodiment of the invention will be described in more detail below referring to the accompanying drawings.

Figure 1:
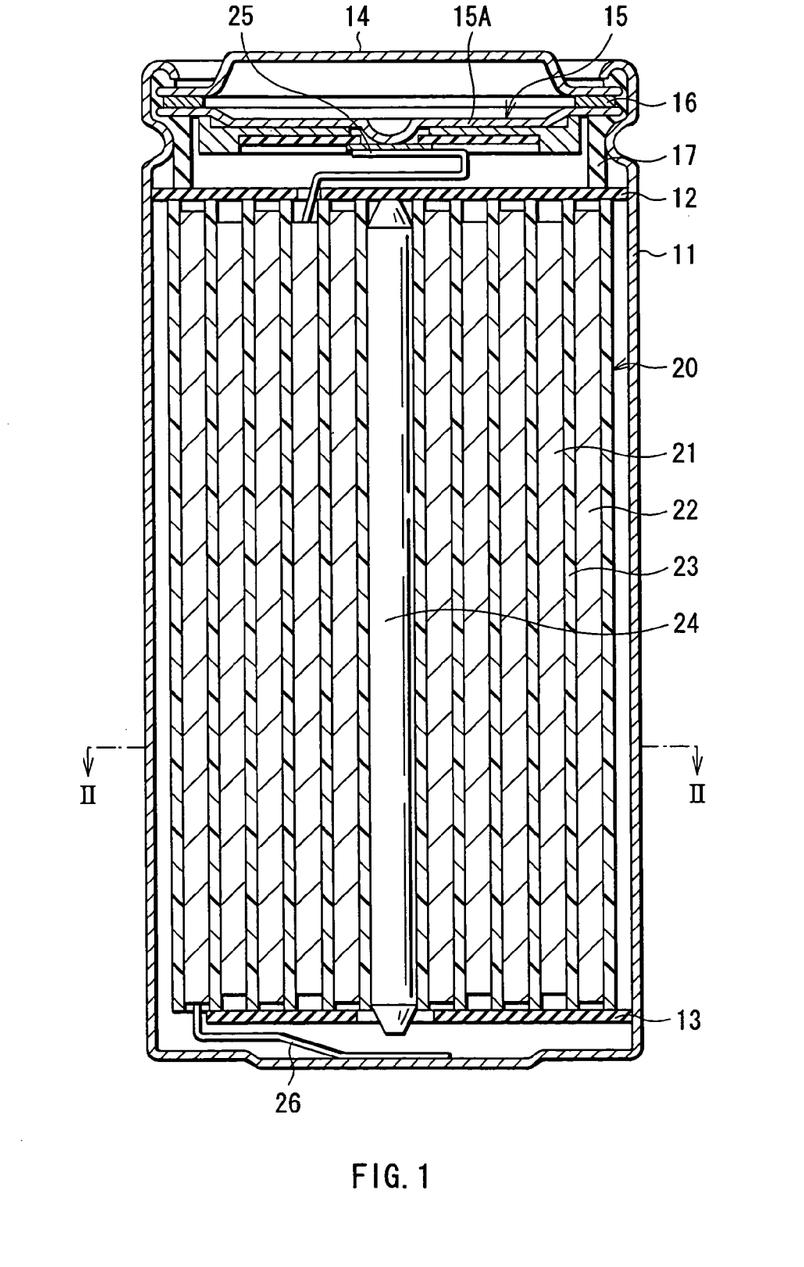
FIG. 1 is a sectional view of a secondary battery according to an embodiment of the invention.

FIG. 1 shows a secondary battery according to an embodiment of the invention. The secondary battery is a so-called cylindrical type, and comprises a spirally wound body 20 in a substantially hollow cylindrical-shaped battery can 11. The battery can 11 is made of, for example, nickel (Ni)-plated iron (Fe). An end portion of the battery can 11 is closed, and the other end portion thereof is opened. A pair of insulating plates 12 and 13 are disposed in the battery can 11 so that the spirally wound body 20 is sandwiched therebetween in a direction perpendicular to a peripheral winding surface.

In the opened end portion of the battery can 11, a battery cover 14 and, a safety valve mechanism 15 and a PTC device (positive temperature coefficient device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15A is flipped so as to disconnect the electrical connection between the battery cover 14 and the spirally wound body 20. When a temperature rises, the PTC device 16 limits a current by an increased resistance, thereby resulting in preventing abnormal heat generation by a large current. The gasket 17 is made of, for example, an insulating material, and its surface is coated with asphalt.

Figure 2:
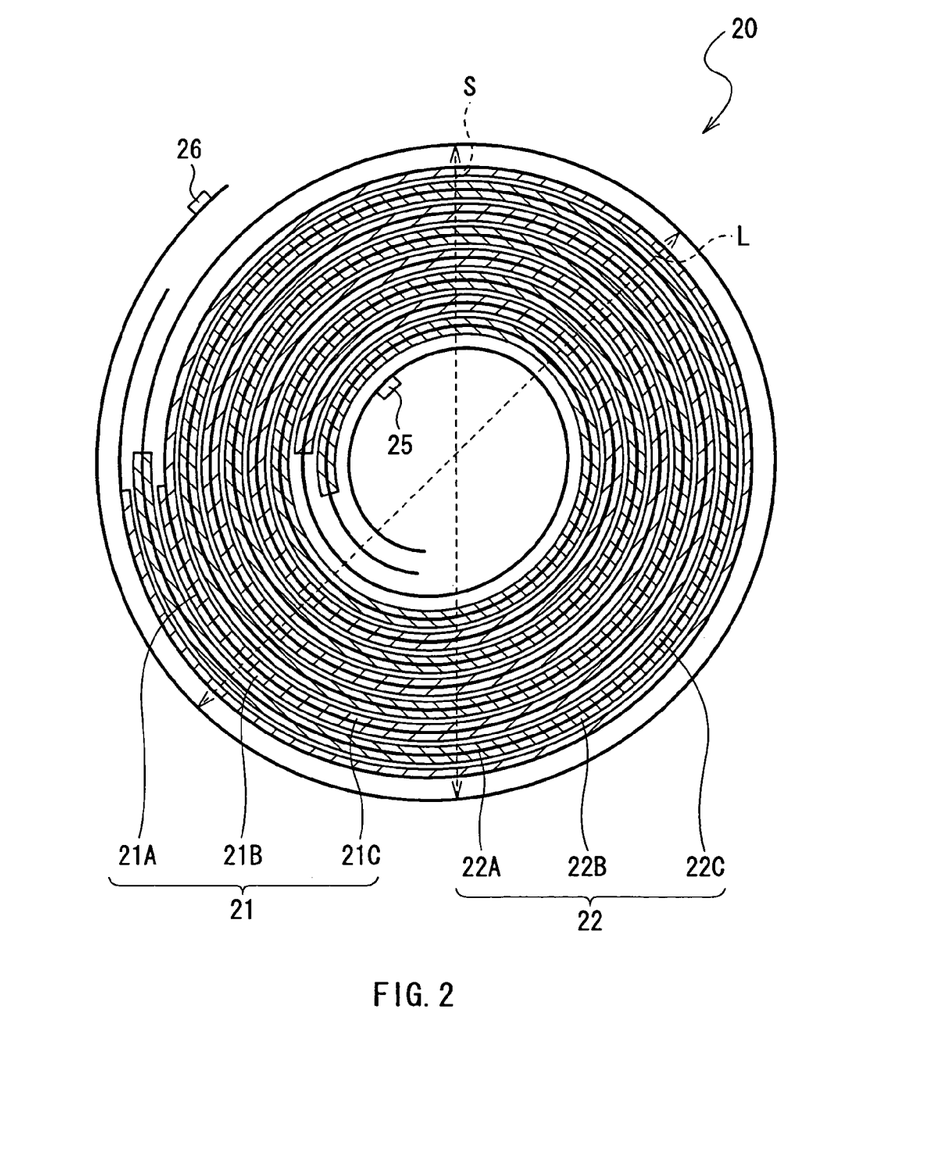
FIG. 2 and FIG. 2A are enlarged sectional views of a spirally wound body taken along a line II-II of FIG. 1.
Figure 2A:
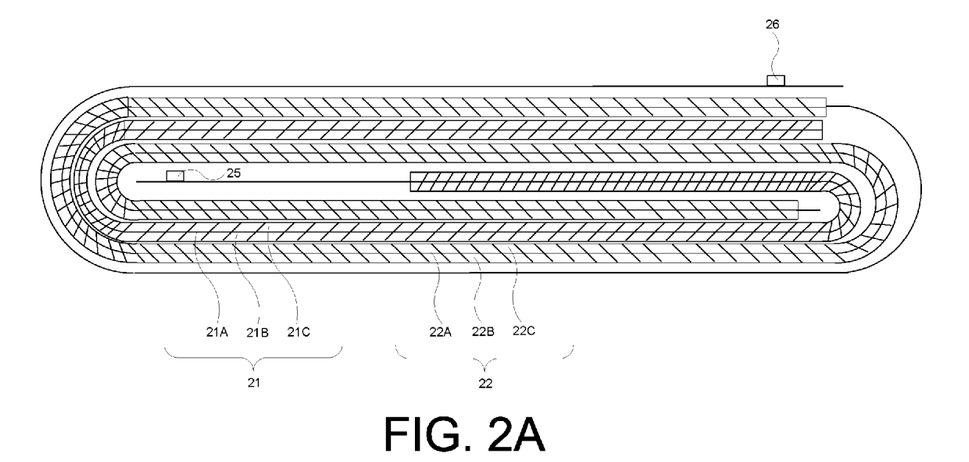

FIG. 2 shows a sectional view of the spirally wound body 20 taken along a line II-II of FIG. 1. The spirally wound body 20 is a spirally wound laminate including a strip-shaped cathode 21 and a strip-shaped anode 22 with a separator 23 in between, and a center pin 24 is inserted into the center of the spirally wound body 20. In FIG. 2, the separator 23 is not shown. The spirally wound body 20 has a cylindrical shape, and a sectional surface thereof with respect to the center of the spirally wound body 20 has a perfect circle shape, an ellipse shape or a shape including a straight line and a curved line as shown in FIG. 2A. A ratio of the longest diameter L to the shortest diameter S in the sectional surface with respect to the center of the spirally wound body 20 is, for example, within a range of 1 to 3 inclusive.

A cathode lead 25 made of aluminum or the like is connected to the cathode 21 of the spirally wound body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

The cathode 21 includes, for example, a cathode current collector 21A having a pair of facing surfaces, an outer cathode active material layer 21B disposed on an outer winding surface of the cathode current collector 21A and an inner cathode active material layer 21C disposed on an inner winding surface of the cathode current collector 21A. The outer cathode active material layer 21B and the inner cathode active material layer 21C may be disposed all over the both surfaces of the cathode current collector 21A, or only either the outer cathode active material layer 21B or the inner cathode active material layer 21C may be disposed on one surface of a portion of the cathode current collector 21A. The cathode current collector 21A is made of, for example, aluminum, nickel, stainless or the like.

The outer cathode active material layer 21B and the inner cathode active material layer 21C includes, for example, a cathode active material, and may include an electronic conductor such as a carbonaceous material and a binder such as polyvinylidene fluoride if necessary. As the cathode active material, a lithium-containing metal complex oxide represented by a general formula $Li_xMIO_2$ is preferable. The lithium-containing metal complex oxide can generate high voltage, and has a high density, so a further higher capacity of the secondary battery can be achieved. MI represents one or more kinds of transition metals, and, for example, at least one kind selected from the group consisting of cobalt, nickel and manganese (Mn) is preferable as MI. The value of x depends upon a charge-discharge state of the battery, and is generally within a range of $0.05 \leq x \leq 1.10$. Specific examples of such a lithium-containing metal complex oxide include $LiCoO_2$, $LiNiO_2$ and the like. In addition, as the cathode active material, one kind or a mixture of two or more kinds selected from them may be used.

Figure 3:
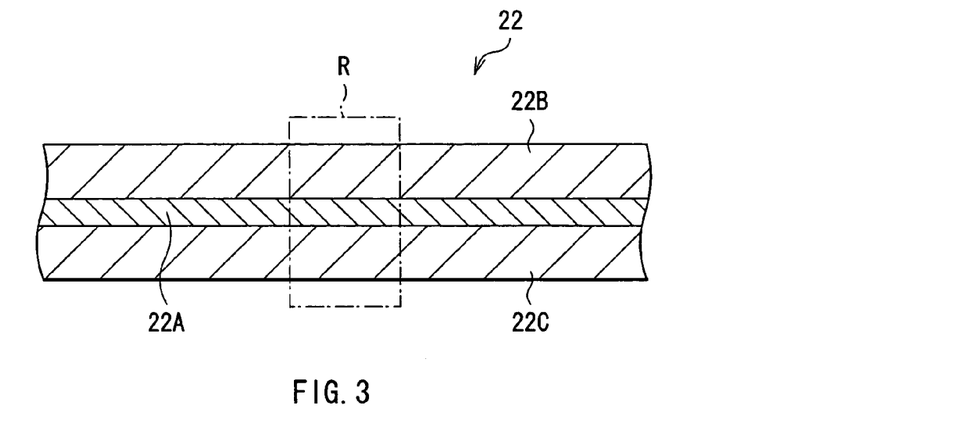
FIG. 3 is an enlarged sectional view of an anode shown in FIG. 2.

The anode 22 includes, for example, a anode current collector 22A having a pair of facing surfaces, an outer anode active material layer 22B disposed on an outer winding surface of the anode current collector 22A and an inner anode active material layer 22C disposed on an inner winding surface of the anode current collector 22A. The outer anode active material layer 22B and the inner anode active material layer 22C may be disposed all over the both surfaces of the anode current collector 22A, or only either the outer anode active material layer 22B or the inner anode active material layer 22C may be disposed on one surface of a portion of the anode current collector 22A.

The anode current collector 22A is preferably made of, for example, copper (Cu), stainless, nickel, titanium (Ti), tungsten (W), molybdenum (Mo), aluminum or the like, and in some cases, the anode current collector 22A is more preferably made of a metal which is easily alloyed with the outer anode active material layer 22B and the inner anode active material layer 22C. For example, as will be described later, when the outer anode active material layer 22B and the inner anode active material layer 22C include at least one kind selected from the group consisting of silicon, tin and compounds thereof, as materials which are easily alloyed, copper, titanium, aluminum, nickel and the like are cited. The anode current collector 22A may include a single layer, or a plurality of layers. In the case where the anode current collector 22A includes a plurality of layers, layers of the anode current collector 22A in contact with the outer anode active material layer 22B and the inner anode active material layer 22C may be made of a metal material which is easily alloyed with the outer anode active material layer 22B and the inner anode active material layer 22C, and other layers thereof may be made of any other metal material.

The outer anode active material layer 22B and the inner anode active material layer 22C include at least one kind selected from the group consisting of metal elements and metalloid elements both capable of forming an alloy with lithium, and compounds thereof, because a higher energy density can be obtained.

Examples of such metal elements and such metalloid elements include palladium (Pd), platinum (Pt), zinc (Zn), cadmium (Cd), mercury (Hg), aluminum (Al), indium (In), silicon, germanium (Ge), tin, lead (Pb), arsenic (As), antimony (Sb) and bismuth (Bi). An example of a compound thereof includes a compound represented by a chemical formula $Ma_sMb_t$. In the chemical formula, Ma represents at least one kind selected from the group consisting of metal elements and metalloid elements both capable of forming an alloy with lithium, and Mb represents at least one element except for Ma. The values of s and t are within a range of s>0 and t≧0, respectively.

Among them, silicon, germanium, tin or lead, or a compound thereof is more preferable, and silicon or tin, or a compound thereof is specifically preferable. It is because silicon, tin and a compound thereof have high ability to insert and extract lithium, so depending upon a combination, the energy density of the anode 22 can be increased. Although the compound of silicon and the compound of tin may be crystalline or amorphous, the compounds are preferably amorphous or a microcrystalline aggregate. An amorphous or microcrystalline compound herein represents a compound in which a half-width of a peak in a diffraction pattern obtained by an X-ray diffraction using CuK α as a specific X-ray is 0.5° or over at 2θ, and which has a broad pattern ranging from 30° to 60° at 2θ.

Examples of compounds of silicon and compounds of tin include $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v≦2$), $SnO_w$ ($0<w≦2$), $SnSiO_3$, $LiSiO$ and $LiSnO$.

The outer anode active material layer 22B and the inner anode active material layer 22C are preferably formed through at least one kind selected from the group consisting of a vapor-phase deposition method, a liquid-phase deposition method and a sintering method. It is because a fracture of the outer anode active material layer 22B and the inner anode active material layer 22C due to expansion and shrinkage thereof according to charge and discharge can be prevented, and the anode current collector 22A, the outer anode active material layer 22B and the inner anode active material layer 22C are formed as one unit, and the electronic conductivity in the outer anode active material layer 22B and the inner anode active material layer 22C can be improved. Moreover, it is because a binder and gaps can be reduced or eliminated, and the anode 22 can be formed into a thin film.

The outer anode active material layer 22B and the inner anode active material layer 22C are preferably alloyed with the anode current collector 22A in at least a portion of an interface with the anode current collector 22A. More specifically, in the interface, an element of the anode current collector 22A is preferably dispersed into the outer anode active material layer 22B and the inner anode active material layer 22C, or an element of the anode active material is preferably dispersed into the anode current collector 22A, or they are preferably dispersed into each other. Although alloying often occurs at the same time when the outer anode active material layer 22B and the inner anode active material layer 22C are formed through a vapor-phase deposition method, a liquid-phase deposition method or a sintering method, alloying may occur by additional heat treatment. In the description, the above-described dispersion of the element is considered as a mode of alloying.

The outer anode active material layer 22B and the inner anode active material layer 22C may be formed through coating, and more specifically the outer anode active material layer 22B and the inner anode active material layer 22C may include powder of the anode active material, and a binder such as polyvinylidene fluoride if necessary.

In this case, powder of a silicon or tin compound preferably has a primary particle diameter of 0.1 μm to 35 μm inclusive, and more preferably 0.1 μm to 25 μm inclusive. When the particle diameter is smaller than the range, an undesirable reaction between particle surfaces and an electrolyte solution which will be described later becomes pronounced, thereby the capacity or the efficiency may decline. On the other hand, when the particle diameter is larger than the range, a reaction with lithium is difficult to proceed in particles, thereby the capacity may decline. Methods of measuring a particle diameter include observation with an optical microscope or an electron microscope, laser diffraction and the like, it is preferable to choose from the methods depending upon a particle diameter range. Moreover, in order to obtain a desired particle diameter, it is preferable to classify particles. A classifying method is not specifically limited, and dry classification such as screening or air classifier and wet classification can be used.

Powder of silicon, tin and a compound thereof can be formed through a conventional method used for, for example, powder metallurgy or the like. Examples of the conventional method include a method in which a raw material is melted and cooled by a melting furnace such as an arc melting furnace or a high-frequency induction furnace, and then is pulverized, a method of rapidly quenching a melted metal as a raw material such as a single-roll quenching method, a two-roll quenching method, a gas atomization method, a water atomization method or a centrifugal atomization method, and a method of consolidating a melted metal as a raw material by a cooling method such as the single-roll quenching method or the two-roll quenching method, and then pulverizing the metal by a method such as a mechanical alloying method. Specifically, the gas atomization method or the mechanical alloying method is preferable. Further, in order to prevent oxidation by oxygen in air, these synthesis and pulverization are preferably carried out in an atmosphere of an inert gas such as argon, nitrogen or helium or in a vacuum.

As a capacity ratio between the outer anode active material layer 22B and the inner anode active material layer 22C in a region R shown in FIG. 3, assuming that the capacity of the outer anode active material layer 22B is 1, the capacity of the inner anode active material layer 22C facing the outer anode active material layer 22B with the anode current collector 22A in between is 0.8 or less. While the metal elements and the metalloid elements capable of forming an alloy with lithium and the compounds thereof expand at the time of lithium insertion, they shrink at the time of lithium extraction. For example, a change in the volume of silicon, tin or the compound thereof is approximately 3 to 4 times; however, in the secondary battery, the ratio of the longest diameter L to the shortest diameter S in the sectional surface with respect to the center of the spirally wound body 20 is within a range of 1 to 3 inclusive, so in the case where lithium is inserted, when the capacity of the inner anode active material layer 22C is larger than 0.8 in a portion with a high curvature around the center of the spirally wound body 20, there is no space for an expanded portion of the inner anode active material layer 22C. Thereby, it is considered that a break in the anode 22 occurs, or a wrinkle occurs in the anode 22, thereby a current is locally concentrated in the wrinkle to form a reaction active site, and in the reaction active site, the electrolyte solution is discomposed. Specifically, when the ratio of the longest diameter L to the shortest diameter S in the sectional surface with respect to the center of the spirally wound body 20 is within a range of 1 to 2 inclusive, such a capacity ratio is preferably set.

Moreover, as the ratio between the outer anode active material layer 22B and the inner anode active material layer 22C in the region R, assuming that the capacity of the outer anode active material layer 22B is 1, the capacity of the inner anode active material layer 22C facing to the outer anode active material layer 22B with the anode current collector 22A in between is 0.6 or over, because when the capacity is smaller than 0.6, a sufficient capacity cannot be obtained.

Although the relationship of the capacity ratio between the outer anode active material layer 22B and the inner anode active material layer 22C may be satisfied in the region R of the anode 22, the relationship is preferably satisfied in each region R throughout the anode 22, because a higher effect can be obtained. There may be cases where the capacities of the outer anode active material layer 22B and the inner anode active material layer 22C are the same from a central side to an outermost side in the spirally wound body 20, and the capacities vary from the central side to the outermost side in the spirally wound body 20. In both cases, although the capacity ratio between the outer anode active material layer 22B and the inner anode active material layer 22C may satisfy the above relationship in the region R, the capacity ratio preferably satisfies the relationship in each region R throughout the anode 22.

When a coin-type cell or a beaker cell is formed using the anode current collector 22A from which the outer anode active material layer 22B or the inner anode active material layer 22C is removed as a working electrode and lithium metal as a counter electrode, the capacity of the outer anode active material layer 22B or the inner anode active material layer 22C can be determined as a discharge capacity when one cycle of charge and discharge is subjected to the cell. At this time, the areas of the counter electrode and the working electrode are within a range of 0.5 $cm^2$ to 2 $cm^2$, and after charge is carried out at a constant current of 1 $mA/cm^2$ until voltage relative to lithium as the counter electrode reaches 10 mV, charge is carried out at a constant voltage of 10 mV until a current value drops to 0.02 $mA/cm^2$, and discharge is carried out at a constant current of 1 $mA/cm^2$ until the voltage relative to lithium as the counter electrode reaches 1.5 V.

When a carbonaceous material capable of inserting and extracting lithium is used as an anode active material, even if the capacity ratio between the outer anode active material layer 22B and the inner anode active material layer 22C is not limited to a predetermined value, a break in the anode hardly occurs or the electrolyte solution is hardly decomposed. It is because a change in the volume of the carbonaceous material according to insertion and extraction of lithium is approximately 1.1 times, so compared to the metal elements and the metalloid elements capable of forming an alloy with lithium and the compounds thereof, the change is extremely small.

The separator 23 is to prevent a short circuit due to physical contact between the cathode 21 and the anode 22 while passing lithium ions therethrough, and is made of a microporous polyolefin film such as a polyethylene film or a polypropylene film. In order to secure safety, the separator 23 preferably has a function of blocking pores at 120° C. or over to increase resistance, thereby interrupting a current.

The separator 23 is impregnated with the electrolyte solution which is a liquid electrolyte. The electrolyte solution includes, for example, a solvent and a lithium salt as an electrolyte salt which is dissolved in the solvent, and may further include various kinds of additives if necessary. Examples of the solvent include propylene carbonate, ethylene carbonate, diethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propylnitrile, anisole, acetate and propionate. As the solvent, one kind or a mixture of two or more kinds selected from them may be used.

Examples of the lithium salt include $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, LiCl and LiBr. Among them, $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$ or $LiN(C_4F_9SO_2)(CF_3SO_2)$ is preferable, and among them, $LiPF_6$ or $LiBF_4$ is more preferable. As the lithium salt, one kind or a mixture of two or more kinds selected from them may be used.

The secondary battery can be manufactured through the following steps, for example.

At first, the outer cathode active material layer 21B and the inner cathode active material layer 21C are formed on the cathode current collector 21A. The outer cathode active material layer 21B and the inner cathode active material layer 21C are formed through the following steps. At first, after the cathode active material, the electronic conductor and the binder are mixed to prepare a cathode mixture, the cathode mixture is dispersed in a dispersion medium such as N-methyl-2-pyrrolidone to produce cathode mixture slurry. After the cathode mixture slurry is applied to the cathode current collector 21A, and is dried, the cathode mixture slurry is compression molded to form the outer cathode active material layer 21B and the inner cathode active material layer 21C. After the cathode 21 is formed, the cathode lead 25 is attached to the cathode current collector 21A.

Moreover, the outer anode active material layer 22B and the inner anode active material layer 22C are formed on the anode current collector 22A. At this time, the amount of the anode active material per unit area of the anode current collector 22A is adjusted so as to control the capacity ratio between the outer anode active material layer 22B and the inner anode active material layer 22C.

The outer anode active material layer 22B and the inner anode active material layer 22C are formed through depositing at least one kind selected from the group consisting of the metal elements and the metalloid elements capable of forming an alloy with lithium as an anode active material and the compounds thereof on the anode current collector 22A by, for example, a vapor-deposition method or a liquid-phase deposition method. Moreover, the outer anode active material layer 22B and the inner anode active material layer 22C may be formed through a sintering method in which a precursor layer including the anode active material in a particle form is formed on the anode current collector 22A, and then the precursor layer is sintered, or may be formed through a combination of two or three methods selected from the group consisting of a vapor-phase deposition method, a liquid-phase deposition method and a sintering method. Thus, when the outer anode active material layer 22B and the inner anode active material layer 22C are formed through at least one method selected from the group consisting of a vapor-phase deposition method, a liquid-phase deposition method and a sintering method, in some cases, the outer anode active material layer 22B and the inner anode active material layer 22C which are alloyed with the anode current collector 22A in at least a portion of an interface with the anode current collector 22A are formed.

Moreover, in order to further alloy the outer anode active material layer 22B and the inner anode active material layer 22C with the anode current collector 22A in the interface therebetween, heat treatment in a vacuum atmosphere or a nonoxidizing atmosphere may be carried out. Specifically, in the case where the outer anode active material layer 22B and the inner anode active material layer 22C are formed through plating which will be described later, the outer anode active material layer 22B and the inner anode active material layer 22C may resist alloying even in the interface with the anode current collector 22A, so the heat treatment is preferably carried out if necessary. Further, when they are formed by a vapor-phase deposition method, there may be cases where characteristics can be improved by further alloying the outer anode active material layer 22B and the inner anode active material layer 22C with the anode current collector 22A in the interface therebetween, so the heat treatment is preferably carried out if necessary.

As the vapor-deposition method, for example, a physical deposition method or a chemical deposition method can be used depending upon kinds of the anode active material, and more specifically, a vacuum deposition method, a sputtering method, an ion plating method, a laser ablation method, a thermal CVD (chemical vapor deposition) method, a plasma CVD method or the like can be used. As the liquid-phase deposition method, a known technique such as electrolytic plating or electroless plating can be used. As the sintering method, a known technique such as, for example, an atmosphere sintering method, a reaction sintering method or a hot press sintering method can be used. However, the vacuum deposition method, the sputtering method, a CVD method, electrolytic plating or electroless plating is preferable.

The outer anode active material layer 22B and the inner anode active material layer 22C may be formed through coating. In this case, after powder of at least one kind selected from the group consisting of the metal elements and the metalloid elements capable of alloying with lithium and the compounds thereof is mixed with a binder to prepare a anode mixture, the anode mixture is dispersed in a dispersion medium such as N-methyl-2-pyrrolidone to produce anode mixture slurry. After the anode mixture slurry is applied to the anode current collector 22A, and is dried, the cathode mixture slurry is compression molded to form the outer anode active material layer 22B and the inner anode active material layer 22C. After the anode 22 is formed, the anode lead 26 is attached to the anode current collector 22A.

Next, a laminate including the cathode 21 and the anode 22 with the separator 23 in between is spirally wound a number of times to form the spirally wound body 20. Next, the spirally wound body 20 is sandwiched between a pair of insulating plates 12 and 13, and the anode lead 26 is welded to the battery can 11, and the cathode lead 25 is welded to the safety valve mechanism 15, and then the spirally wound body 20 is contained in the battery can 11. After that, the electrolyte solution is injected into the battery can 11 so that the separator 23 is impregnated with the electrolyte solution. Next, the battery cover 14, the safety valve mechanism 15 and the PTC device 16 are fixed in an opened end portion of the battery can 11 through caulking by the gasket 17. Thereby, the secondary battery shown in FIG. 1 is formed.

In the secondary battery, when charge is carried out, for example, lithium ions are extracted from the cathode 21, and are inserted into the anode 22 through the electrolyte solution. When discharge is carried out, for example, the lithium ions are extracted from the anode 22, and are inserted into the cathode 21 through the electrolyte solution. The outer anode active material layer 22B and the inner anode active material layer 22C expand and shrink according to charge and discharge. However, at least in the region R, as the capacity ratio between the outer anode active material layer 22B and the inner anode active material layer 22C, assuming that the capacity of the outer anode active material layer 22B is 1, the capacity of the inner anode active material layer 22C facing the outer anode active material layer 22B with the anode current collector 22A in between is 0.8 or less, so a break in the anode 22 can be prevented, and a wrinkle can be prevented from occurring in the anode 22, thereby the decomposition of the electrolyte solution can be prevented. Moreover, the capacity of the inner anode active material layer 22C is 0.6 or over, so a superior capacity can be obtained.

Thus, in the embodiment, as the capacity ratio between the outer anode active material layer 22B and the inner anode active material layer 22C in at least the region R, assuming that the capacity of the outer anode active material layer 22B is 1, the capacity of the inner anode active material layer 22C is within a range of 0.6 to 0.8 inclusive, so specifically in the case where the ratio of the longest diameter L to the shortest diameter S in the sectional surface with respect to the center of the spirally wound body 20 is within a range of 1 to 3 inclusive, a superior capacity and superior cycle characteristics can be obtained.

The secondary battery according to the embodiment can be used in, for example, headphone stereos, videocassette recorders, liquid crystal display televisions, portable CD (compact disc) players, MD (minidisk) players, notebook computers, cellular phones, electric razors, transceivers, electronic organizers, electronic calculators, radios, toys, game machines, clocks, pacemakers or the like. In addition, the secondary battery can be combined with a generator such as solar cell or fuel cell.

EXAMPLES

Next, specific examples of the invention will be described below.

Examples 1-1 Through 1-4

As Examples 1-1 through 1-4 and Comparative Examples 1-1 through 1-3, secondary batteries shown in FIGS. 1 and 2 were formed. At first, after 91 wt % of $LiNi_{0.8}Co_{0.19}Al_{0.01}O_2$ with an average secondary particle diameter of 15 μm as a cathode active material, 6 wt % of graphite as an electronic conductor and 3 wt % of polyvinylidene fluoride as a binder were mixed to prepare a cathode mixture, the cathode mixture was dispersed in N-methyl-2-pyrrolidone to produce cathode mixture slurry. Next, the cathode mixture slurry was applied to the cathode current collector 21A made of aluminum with a thickness of 20 μm, and was dried. Then, the cathode mixture slurry was compression molded by a roller press to form the outer cathode active material layer 21B and the inner cathode active material layer 21C, thereby the cathode 21 was formed. After that, the cathode lead 25 with an insulating tape is attached to an end of the cathode current collector 21A.

Moreover, after tin was deposited on both sides of the anode current collector 22A made of electrolytic copper foil through a electron beam evaporation method, heat treatment was carried out for 24 hours at 200° C. at a degree of vacuum of $1\times10^{-5}$ Torr (approximately $1.33\times10^{-3}$ Pa) to form the outer anode active material layer 22B and the inner anode active material layer 22C, thereby the anode 22 was formed. At that time, the amount of the anode active material per unit area of the anode current collector 22A was changed in Examples 1-1 through 1-4 and Comparative Examples 1-1 through 1-3. After that, the anode lead 26 was attached to an end of the anode current collector 22A.

Figure 4:
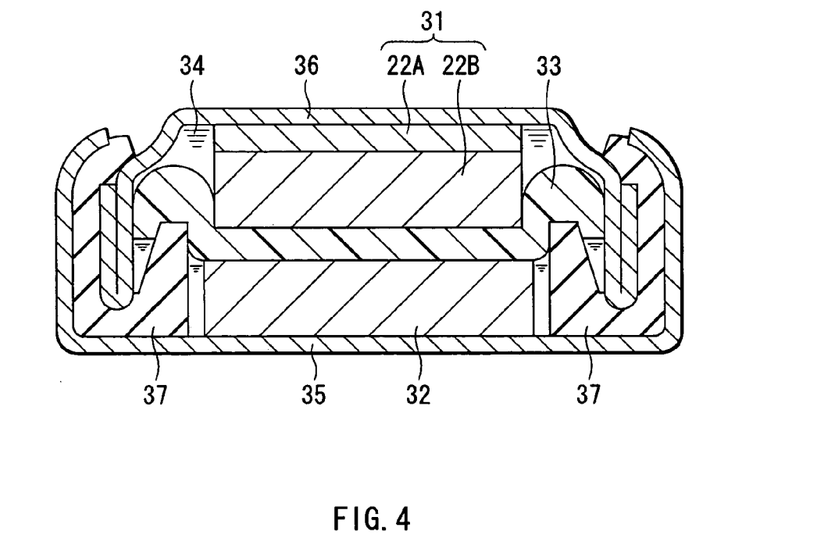
FIG. 4 is a sectional view of a coin-type cell formed in an example of the invention.

The capacities of the outer anode active material layer 22B and the inner anode active material layer 22C in the anode 22 were determined. At first, after a portion of the anode 22 was taken out, and the outer anode active material layer 22B or the inner anode active material layer 22C was removed with a sandpaper, the portion of the anode 22 was stamped into a circle shape with a diameter of 15 mm, and the stamped anode 22 was used as a working electrode to form the coin-type cell shown in FIG. 4 with a diameter of 20 mm and a thickness of 16 mm. The coin-type cell was formed through laminating a working electrode 31 including the anode current collector 22A and the outer anode active material layer 22B or the inner anode active material layer 22C, and a counter electrode 32 made of lithium metal with a thickness of 1 mm with a separator 33 in between, and injecting the electrolyte solution 34. FIG. 4 shows the case where the inner anode active material layer 22C was removed. As the separator 33, a porous film of polyethylene with a thickness of 20 µm was used. As the electrolyte solution 34, a mixed solvent containing ethylene carbonate and ethyl methyl carbonate at a volume ratio of 30:70 in which $LiPF_6$ was dissolved at a concentration of 1.0 mol/l was used. The working electrode 31, the counter electrode 32 and so on were contained in a package can 35 and a package cup 36, and the package can 35 and the package cup 36 were sealed through caulking by a gasket 37.

Next, after the coin-type cell was charged at a constant current of 1 mA/cm$^2$ until a voltage relative to lithium of the counter electrode 32 reached 10 mV, the coin-type cell was charged at a constant voltage of 10 mV until a current value dropped to 0.02 mA/cm$^2$, and then the coin-type cell was discharged at a constant current of 1 mA/cm$^2$ until the voltage relative to lithium of the counter electrode 32 reached 1.5 V, then a discharge capacity was determined. The discharge capacity was divided by the area of the working electrode 31 so as to obtain a capacity Cout per cm$^2$ of the outer anode active material layer 22B or a capacity Cin per cm$^2$ of the inner anode active material layer 22C. The obtained results are shown in Table 1.

of 30 µm, and they were wound to form the spirally wound body 20 with a shortest diameter S of 17.37 mm and a longest diameter L of 17.45 mm.

After the spirally wound body 20 was formed, the spirally wound body 20 was sandwiched between a pair of insulating plates 12 and 13, and the cathode lead 25 was welded to the safety valve mechanism 15, and the anode lead 26 was welded to the battery can 11. Then, the spirally wound body 20 was contained in the battery can 11 made of iron. After that, the center pin 24 was inserted into the center of the spirally wound body 20. Next, the electrolyte solution was injected into the battery can 11. As the electrolyte solution, a mixed solvent containing ethylene carbonate and ethyl methyl carbonate at a volume ratio of 30:70 in which $LiPF_6$ was dissolved at a concentration of 1.0 mol/l was used.

After the electrolyte solution was injected into the battery can 11, the battery cover 14 was caulked into the battery can 11 by the gasket 17, thereby the cylindrical type secondary battery with a diameter of 18 mm and a height of 65 mm of each of Examples 1-1 through 1-4 was obtained.

The secondary batteries of Examples 1-1 through 1-4 and Comparative Examples 1-1 through 1-3 were subjected to 100 cycles of charge and discharge so as to determine the cycle retention rate. At that time, charge was carried out at a constant current of 1 A until the battery voltage reached 4.2 V, then charge was carried out at a constant voltage of 4.2 V until the total charge time reached 20 hours in the first cycle and 5 hours in the second or later cycle, and discharge was carried out at a constant current of 1 A in the first cycle and at a constant current of 2 A in the second or later cycle until the battery voltage reached 2.5 V. The cycle retention rate was determined from the discharge capacity in the second cycle and the discharge capacity in the 100th cycle as (the discharge capacity in the 100th cycle/the discharge capacity in the sec-

TABLE 1

| | ANODE ACTIVE MATERIAL LAYER | | | | CA- | CYCLE | STATE OF ANODE ON CENTRAL SIDE OF | STATE OF SEPARATOR ON |
|---|---|---|---|---|---|---|---|---|
| | CAPACITY | | | | | RETENTION | SPIRALLY | CENTRAL SIDE |
| | Cout (mAh/cm$^2$) | Cin (mAh/cm$^2$) | Cin/Cout | MATERIAL | FORMING METHOD | PACITY (mAh) | RATE (%) | WOUND BODY | OF SPIRALLY WOUND BODY |
| EXAMPLE 1-1 | 2.8 | 2.2 | 0.78 | Sn | DEPOSITION | 2350 | 60 | SMOOTH | — |
| EXAMPLE 1-2 | 2.8 | 2.0 | 0.71 | Sn | DEPOSITION | 2310 | 65 | SMOOTH | — |
| EXAMPLE 1-3 | 2.8 | 1.8 | 0.64 | Sn | DEPOSITION | 2260 | 67 | SMOOTH | — |
| EXAMPLE 1-4 | 2.8 | 1.7 | 0.6 | Sn | DEPOSITION | 2260 | 68 | SMOOTH | — |
| COMPARATIVE EXAMPLE 1-1 | 2.8 | 2.5 | 0.89 | Sn | DEPOSITION | 2390 | 50 | WITH WRINKLE | STREAKED BROWN STAIN |
| COMPARATIVE EXAMPLE 1-2 | 2.8 | 2.8 | 1.0 | Sn | DEPOSITION | 2420 | 40 | WITH WRINKLE | STREAKED BROWN DEPOSIT |
| COMPARATIVE EXAMPLE 1-3 | 2.8 | 1.4 | 0.5 | Sn | DEPOSITION | 2090 | 65 | SMOOTH | — |

The formed anode 22 was analyzed by XPS (X-ray photoelectron spectroscopy) and AES (Auger electron spectroscopy). As a result, it was confirmed that the outer anode active material layer 22B and the inner anode active material layer 22C were alloyed with the anode current collector 22A in at least a portion of the interface with the anode current collector 22A.

After the cathode 21 and the anode 22 were formed, the cathode 21 and the anode 22 were laminated with the separator 23 made of a porous polyethylene film with a thickness ond cycle×100). Table 1 shows the discharge capacity in the first cycle and the cycle retention rate.

Moreover, the secondary batteries which were subjected to 100 cycles of charge and discharge were disassembled so as to observe the anode 22 and the separator 23. Table 1 shows the states of the anode 22 and the separator 23 on the central side of the spirally wound body 20.

It was obvious from Table 1 that in Examples 1-1 through 1-4-in which Cin/Cout was within a range of 0.6 to 0.8 inclusive, the capacity was 2260 mAh or over, and the cycle retention rate was 60% or over, so they were superior. On the other hand, in Comparative Examples 1-1 and 1-2 in which Cin/Cout was larger than 0.8, the capacity was as large as 2390 mAh or over, but the cycle retention rate was as small as 50% or less. It was considered that it was because the electrolyte solution was decomposed in the anode since a wrinkle occurred in the anode on the central side of the spirally wound body 20, and a streaked stain or deposit was observed in the separator. Moreover, in Comparative Example 1-3 in which Cin/Cout was smaller than 0.6, the cycle retention rate was as high as 65%, but the capacity was as small as 2090 mAh.

In other words, it was found out that as the capacity ratio per $cm^2$ between the outer anode active material layer 22B and the inner anode active material layer 22C both including tin, assuming that the capacity of the outer anode active material layer 22B was 1, the capacity of the inner anode Examples 2-1 through 2-3 were determined as in the case of Examples 1-1 through 1-4. Moreover, the anode 22 was analyzed by XPS and AES. As a result, it was confirmed that the outer anode active material layer 22B and the inner anode active material layer 22C were alloyed with the anode current collector 22A in at least a portion of the interface with the anode current collector 22A. Further, the secondary batteries of Examples 2-1 through 2-4 and Comparative Examples 2-1 through 2-3 were subjected to 100 cycles of charge and discharge as in the case of Examples 1-1 through 1-4 so as to determine the cycle retention rate, and the secondary batteries which were subjected to 100 cycles of charge and discharge were disassembled so as to observe the anode 22 and the separator 23. The results are shown in Table 2.

TABLE 2

| | ANODE ACTIVE MATERIAL LAYER | | | | CA-PACITY (mAh) | CYCLE RETENTION RATE (%) | STATE OF ANODE ON CENTRAL SIDE OF SPIRALLY WOUND BODY | STATE OF SEPARATOR ON CENTRAL SIDE OF SPIRALLY WOUND BODY |
|---|---|---|---|---|---|---|---|---|
| | CAPACITY | | | | | | | |
| | Cout (mAh/cm$^2$) | Cin (mAh/cm$^2$) | Cin/Cout | MATERIAL | FORMING METHOD | | | |
| EXAMPLE 2-1 | 2.3 | 1.8 | 0.78 | Si | SINTERING | 2400 | 61 | SMOOTH | — |
| EXAMPLE 2-2 | 2.3 | 1.6 | 0.7 | Si | SINTERING | 2360 | 63 | SMOOTH | — |
| EXAMPLE 2-3 | 2.3 | 1.5 | 0.65 | Si | SINTERING | 2300 | 64 | SMOOTH | — |
| EXAMPLE 2-4 | 2.3 | 1.4 | 0.61 | Si | SINTERING | 2250 | 69 | SMOOTH | — |
| COMPARATIVE EXAMPLE 2-1 | 2.3 | 2.8 | 1 | Si | SINTERING | 2420 | 53 | SMOOTH | STREAKED BROWN STAIN |
| COMPARATIVE EXAMPLE 2-2 | 2.3 | 2.5 | 1.1 | Si | SINTERING | 2430 | 45 | WITH WRINKLE | STREAKED BROWN DEPOSIT |
| COMPARATIVE EXAMPLE 2-3 | 2.4 | 1.2 | 0.5 | Si | SINTERING | 2100 | 60 | SMOOTH | — | active material layer 22C was set within a range of 0.6 to 0.8 inclusive, thereby a decline in capacity could be prevented, and the cycle characteristics could be improved.

Examples 2-1 Through 2-4

As Examples 2-1 through 2-4 and Comparative Examples 2-1 through 2-3, secondary batteries were formed as in the case of Examples 1-1 through 1-4, except that the outer anode active material layer 22B and the inner anode active material layer 22C both including silicon were formed through a sintering method. The outer anode active material layer 22B and the inner anode active material layer 22C were formed through the following steps. At first, 95 wt % of silicon powder with an average diameter of 1 am and 5 wt % of polyvinylidene fluoride as a binder were mixed to prepare an anode mixture, and the anode mixture was dispersed in N-methyl-2-pyrrolidone to produce anode mixture slurry. Then, after the anode mixture slurry was applied to the anode current collector 22A made of electrolytic copper foil, and was dried, the anode mixture slurry was compressed. Then, the anode mixture slurry was subjected to heat treatment for 12 hours at 400° C. in a vacuum atmosphere to form the outer anode active material layer 22B and the inner anode active material layer 22C. At that time, the amount of the anode active material per unit area of the anode current collector 22A was changed in Examples 2-1 through 2-4 and Comparative Examples 2-1 through 2-3.

The capacities of the outer anode active material layer 22B and the inner anode active material layer 22C in the anode 22 of each of Examples 2-1 through 2-4 and Comparative It was obvious from Table 2 that also in the case where the outer anode active material layer 22B and the inner anode active material layer 22C both including silicon were formed through the sintering method, there was the same tendency as in the case of Examples 1-1 through 1-4 and Comparative Examples 1-1 through 1-3. In other words, it was found out that also in the case where the outer anode active material layer 22B and the inner anode active material layer 22C both included silicon, or in the case where the outer anode active material layer 22B and the inner anode active material layer 22C were formed through the sintering method, as the capacity ratio per $cm^2$ between the outer anode active material layer 22B and the inner anode active material layer 22C, assuming that the capacity of the outer anode active material layer 22B was 1, the capacity of the inner anode active material layer 22C was set within a range of 0.6 to 0.8 inclusive, thereby a decline in capacity could be prevented, and the cycle characteristics could be improved.

The present invention is described referring to the embodiment and the examples, but the invention is not limited to the above embodiment and the above examples, and is variously modified. For example, in the embodiment and the examples, the electrolyte solution which is a liquid electrolyte is used; however any other electrolyte may be used. Examples of the other electrolyte include a gel electrolyte in which a high molecular weight compound holds an electrolyte solution, a solid electrolyte having ionic conductivity, a mixture of the solid electrolyte and the electrolyte solution, or a mixture of the solid electrolyte and the gel electrolyte.

For the gel electrolyte, various high molecular weight compounds which absorb the electrolyte solution to be gelatinized can be used. Examples of such high molecular weight compounds include a fluorine-based high molecular weight compound such as polyvinylidene fluoride, or a copolymer of vinylidene fluoride and hexafluoropropylene, an ether-based high molecular weight compound such as polyethylene oxide or a cross-link including polyethylene oxide, and polyacrylonitrile. More specifically, in terms of stability of oxidation-reduction, the flurorine-based high molecular weight compound is preferable.

As the solid electrolyte, for example, a solid high molecular weight electrolyte in which an electrolyte salt is dispersed in a high molecular weight compound having ionic conductivity, or an inorganic solid electrolyte made of ion conducting glass, ionic crystal or the like can be used. When the solid electrolyte is used, the separator may be removed. As the high molecular weight compound, for example, an ether-based high molecular weight compound such as polyethylene oxide or a cross-link including polyethylene oxide, a ester-based high molecular weight compound such as polymethacrylate, an acrylate-based high molecular weight compound, a mixture thereof, or a copolymer thereof can be used. Further, as the inorganic solid electrolyte, lithium nitride, lithium iodide or the like can be used.

In the above embodiment and the above examples, the secondary battery in which the spirally wound body 20 is contained in the battery can 11 is described; however, the invention can be applied to a secondary battery in which a spirally wound body is contained in a film-shaped package member in a like manner. Further, the invention can be applied to not only the secondary batteries but also primary batteries.

Moreover, in the above embodiment and the above examples, the outer anode active material layer 22B and the inner anode active material layer 22C are formed on the anode current collector 22A; however, any other layer may be formed between the anode current collector and the anode active material layer.

As described above, in the battery according to the invention, as a capacity ratio between the outer anode active material layer and the inner anode active material layer in at least a region, assuming that the capacity of the outer anode active material layer is 1, the capacity of the inner anode active material layer is 0.8 or less, so a break in the anode can be prevented, and a wrinkle can be prevented from occurring in the anode, thereby the decomposition of the electrolyte can be prevented. Therefore, superior cycle characteristics can be obtained. Moreover, the capacity of the inner anode active material layer is 0.6 or over, so a superior capacity can be obtained.

Obviously many modifications and variations of the present invention are possible in the light of the above teachings. It is therefore to be understood that within the scope of the appended claims the invention may be practiced otherwise than as specifically described.

What is claimed is:

1. A battery, comprising:
    a spirally wound body including a spirally wound laminate of a cathode and an anode with an electrolyte in between, wherein,
        the anode includes (a) an anode current collector having a plurality of layers, including an inner current collector layer and an outer current collector layer, (b) an outer anode active material layer disposed on an outer winding surface of the outer current collector layer of the anode current collector, and (c) an inner anode active material layer disposed on an inner winding surface of the inner current collector layer of the anode current collector,
        the outer anode active material layer and the inner anode active material layer both include an amorphous compound or a microcrystalline compound of silicon or tin having a particle diameter in a range of 0.1 µm to 35 µm,
        a capacity ratio per unit area of the inner anode active material layer to the outer anode active material layer in at least one region is within a range of 0.6 to 0.8 inclusive, and
        a sectional surface of the spirally wound body has one of an elliptical shape and a shape including a straight line and a curved line, and a ratio of a longest diameter to a shortest diameter of the sectional surface of the spirally wound body with respect to the center of the spirally wound body is within a range of 1 to 3 inclusive.

2. The battery according to claim 1, wherein the outer anode active material layer and the inner anode active material layer are alloyed with the anode current collector in at least a portion of an interface with the anode current collector.

3. The battery according to claim 1, wherein the outer anode active material layer and the inner anode active material layer are formed on the anode current collector through at least one method selected from a group consisting of a vapor-phase deposition method, a liquid-phase deposition method and a sintering method.

* * * * *